United States Patent
Natarajan et al.

(10) Patent No.: US 9,594,853 B2
(45) Date of Patent: Mar. 14, 2017

(54) COMBINED DETERMINISTIC AND PROBABILISTIC MATCHING FOR DATA MANAGEMENT

(71) Applicant: International Business Machines Corporation, Armonk, NY (US)

(72) Inventors: Subashree Natarajan, Bangalore (IN); Ankur B. Shah, Surat (IN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/014,750

(22) Filed: Aug. 30, 2013

(65) Prior Publication Data

US 2015/0066969 A1 Mar. 5, 2015

(51) Int. Cl.
 G06F 7/00 (2006.01)
 G06F 17/30 (2006.01)

(52) U.S. Cl.
 CPC .. G06F 17/30985 (2013.01); G06F 17/30303 (2013.01)

(58) Field of Classification Search
 CPC ......... G06F 17/30985; G06F 17/30303; G06F 17/30598; G06F 19/322
 USPC ................ 707/706, 750, 776, 758, 769, 780
 See application file for complete search history.

(56) References Cited

U.S. PATENT DOCUMENTS

| | | | |
|---|---|---|---|
| 7,236,973 B2 | 6/2007 | Kalthoff et al. | |
| 7,509,326 B2 | 3/2009 | Krabel et al. | |
| 7,660,782 B2 | 2/2010 | Andrews | |
| 8,010,905 B2 | 8/2011 | Ryan et al. | |
| 8,180,732 B2 | 5/2012 | Krabel et al. | |
| 8,332,366 B2 | 12/2012 | Schumacher et al. | |
| 8,903,848 B1* | 12/2014 | Bahrami | G06F 17/30424 455/456.2 |
| 9,336,283 B2* | 5/2016 | Giang | G06F 17/30533 |
| 2002/0073138 A1* | 6/2002 | Gilbert et al. | 709/201 |
| 2006/0271401 A1* | 11/2006 | Lassetter | G06F 19/322 705/2 |
| 2008/0005106 A1* | 1/2008 | Schumacher et al. | 707/6 |
| 2009/0287868 A1 | 11/2009 | Lee | |
| 2012/0197968 A1 | 8/2012 | Korovin et al. | |
| 2014/0149422 A1* | 5/2014 | Sadler | G06Q 50/01 707/741 |
| 2014/0258162 A1* | 9/2014 | Maran | G06F 17/30386 705/325 |

OTHER PUBLICATIONS

Lin, Eileen et al., "IBM federated database technology", Nov. 13, 2012, Published Mar. 1, 2002, pp. 1-19, <http://www.ibm.com/developerworks/data/library/techarticle/0203haas/0203haas.html>.

(Continued)

*Primary Examiner* — MD. I Uddin
(74) *Attorney, Agent, or Firm* — Maeve Carpenter

(57) ABSTRACT

A method for data management. The method includes a computer selecting a first data record and a second data record. The computer determines whether the first data record and the second data record share a deterministic matching category. Responsive to determining the first data record does not share a deterministic matching category with the second data record, the computer determines whether the first data record and the second data record share a probabilistic matching category.

7 Claims, 3 Drawing Sheets

(56) References Cited

OTHER PUBLICATIONS

Loshin, David, "Deterministic vs. Probabilistic for MDM?", Dec. 6, 2007, The Data Roundtable, pp. 1-4, <http:.//www.dataroundtable.com/?p=323>.

McCauley, Chris, "Matching: Determinism and Probability in a new context", informatica Perspectives Blog, Posted Jan. 31, 2007, pp. 1-2, <http://blogs.informatica.com/perspectives/2007/01/31/matching-determinism-and-probability-in-a-new-context/>.

IBM, "Governance The Big Data Hub", <http://masteringdatamanagement.com/index.php/2009/10/15/using-probabilistic-matching-for-successful-mdm/> redirected to <http://www.ibmbigdatahub.com/topic/518, provided by inventor on Aug. 29, 2012.

"How to Deploy Stored Procedures to a Federated Database in SQL Azure", Posted Jan. 31, 2012, pp. 1-3, Windows Azure Blog, Microsoft Cloud Computing Platform, <http://www.windows-azure.net/how-to-deploy-stored-procedures-to-a-federated-database-in-sql-azure/>, Copyright 2013.

"Matching Technology Improves Data Quality", White Paper, talend* *open data solutions, pp. 1-18, copyright 2010 Talend.

"Updated Arch1 Drawing", Mirantis Inc., OpenStack, pp. 1-2, <http://www.mirantis.com/wp-content/uploads/2012/09/updated_arch1_drawing.png"\*>, Copyright 2005-2013.

"Blogpost Dedicated Endpoint Node", Mirantis Inc., OpenStack, pp. 1-2, <http://www.mirantis.com/wp-content/uploads/2012/09/blogspot_dedicated_endpoint_node.png"\*MERGEFORMATINET>, Copyright 2005-2013.

"Blogpost Simple controller Redundancy", Mirantis Inc., OpenStack, pp. 1-2, <http://www.mirantis.com/wp-content/uploads/2012/09/blogspot_simple_controller_redundancy.png"\*MERGEFORMATINET>, Copyright 2005-2013.

"Blogpost Service Distribution", Mirantis Inc., OpenStack, pp. 1-2, <http://www.mirantis.com/wp-content/uploads/2012/09/blogspot_service_distribution.png"\*>, Copyright 2005-2013.

"Secure and unique cost effective approach to circumvent the impact of a DoS attack in Clouded federated database system", Authors Disclosed Anonymously, IP.Com Prior Art Database Technical Disclosure, IPCOM000194123D, Mar. 17, 2010.

U.S. Appl. No. 14/301,790, filed Jun. 11, 2014.

* cited by examiner

COMBINED DETERMINISTIC AND PROBABILISTIC MATCHING FOR DATA MANAGEMENT

FIELD OF THE INVENTION

The present invention relates generally to the field of data processing, and more particularly to data management.

BACKGROUND OF THE INVENTION

Master data refers to classes of information such as products or suppliers that are common to a number of computer systems and applications within a company. The different computer systems can belong to the same company or can belong to different companies, such as vendors or contractors. The master data can be stored in a number of different locations, computer systems, and/or incompatible formats. Master data management (MDM) is a top priority for many organizations as they aim to deliver and leverage trusted business information. Master data is high value information such as customer, supplier, partner, product, materials, and employee data. Master data is critical for addressing business problems and is at the heart of every business transaction, application and decision. An effective MDM strategy can assist organizations in responding quickly and easily to existing and changing business needs. MDM software is used to make sure master data entities are kept consistent and accurate.

MDM relies on clean, duplicate-free data to be an effective business tool. Matching plays an important role in achieving a single view of customers, parts, transactions and almost any type of data. Matching is the process of putting together similar or identical data records in order to either identify or remove duplicates from the data. Matching is often used to link together data records that have some sort of relationship. The strength of matching technology is defined by how powerful the algorithms are to establish the match. There are two common types of matching technology on the market today: deterministic and probabilistic. Deterministic matching is rules-based, where data records are compared using fuzzy algorithms. Probabilistic matching technology performs statistical analysis on the data, and then uses that analysis to weight the match.

SUMMARY

Embodiments of the present invention disclose a method, computer program product, and computer system for data management. The method includes a computer selecting a first data record and a second data record. The computer determines whether the first data record and the second data record share a deterministic matching category. Responsive to determining the first data record does not share a deterministic matching category with the second data record, the computer determines whether the first data record and the second data record share a probabilistic matching category.

DETAILED DESCRIPTION

Figure 1:
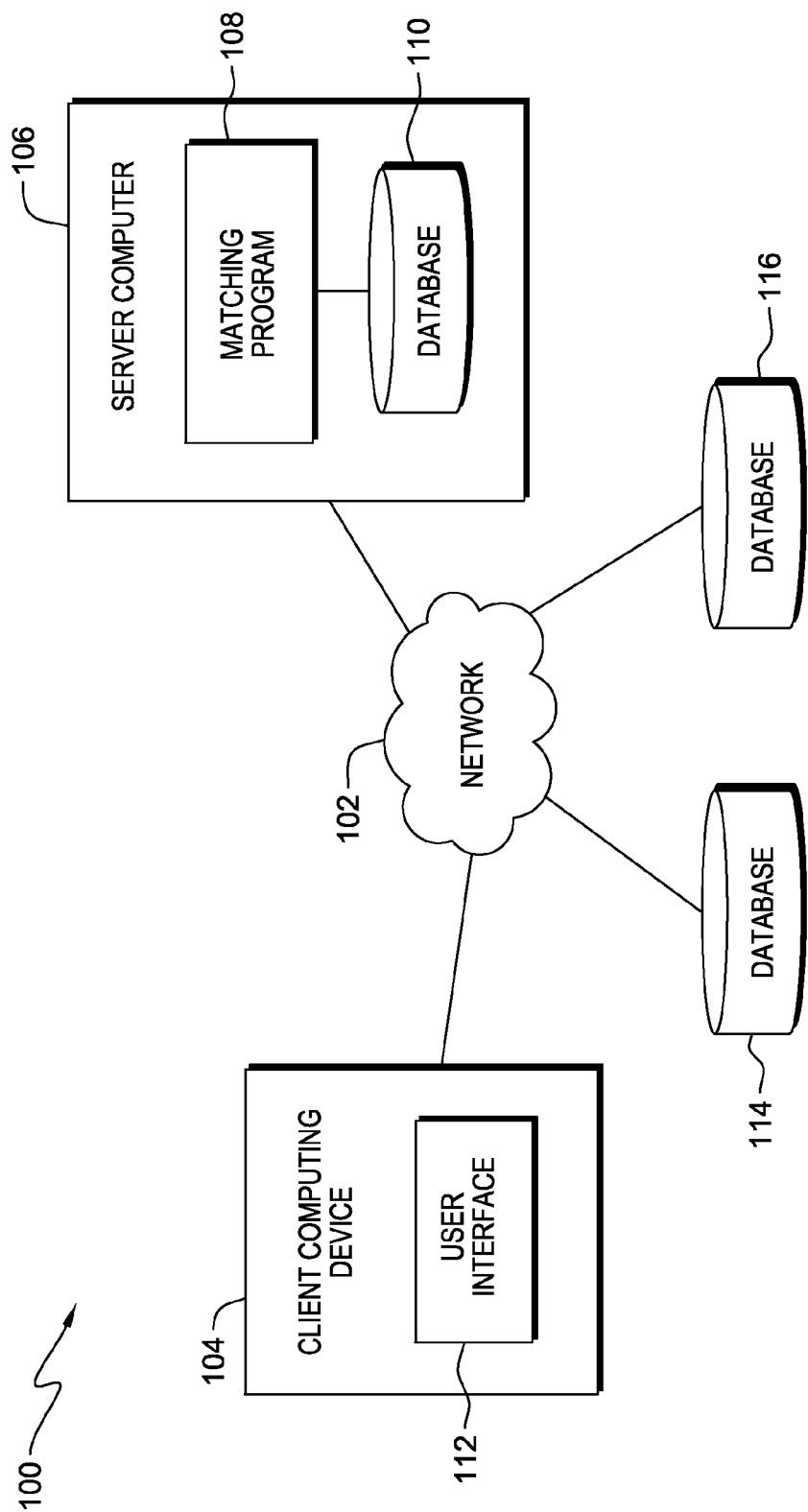
FIG. 1 is a functional block diagram illustrating a distributed data processing environment, in accordance with an embodiment of the present invention.

One of the key features of master data management (MDM) is a matching engine that delivers high volume matching and linking through high performance data processing and scalable database structure. Matching engines typically use one of two technologies: probabilistic or deterministic. While probabilistic matching has proven to be very successful in the MDM space, there are instances where strategies incorporated in probabilistic matching prove to be inefficient when matching data records that can be easily matched using rules. Embodiments of the present invention recognize the value of creating a matching engine that enhances the algorithm framework of a probabilistic matching engine to include an additional deterministic algorithm. Embodiments of the present invention provide a single matching engine capable of processing data intelligently using both probabilistic as well as deterministic matching techniques depending on the data being matched, resulting in improved performance. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made. In the illustrated embodiment, distributed data processing environment 100 comprises server computer 106, client computing device 104, database 114, and database 116, all interconnected via network 102.

Server computer 106 may be a laptop computer, a tablet computer, a netbook computer, a personal computer (PC), a desktop computer, a personal digital assistant (PDA), a smart phone, or any programmable electronic device capable of communicating with client computing device 104, database 114, and database 116 via network 102. Server computer 106 includes matching program 108 and database 110. In other various embodiments of the present invention, server computer 106 may represent a computing system utilizing clustered computers and components to act as a single pool of seamless resources when accessed through a network, such as network 102. This is a common implementation for data centers and for cloud computing applications. Server computer 106 may include internal and external hardware components, as depicted and described in further detail with respect to FIG. 3.

Matching program 108 provides a combined matching engine that includes both probabilistic and deterministic matching technology. Both probabilistic and deterministic matching use categories known as "buckets" in the respective matching algorithms. A bucket is a data matching category. The deterministic buckets are very restrictive and adhere strictly to the deterministic rules. Rules-based matching algorithms identify linkage between data records, allowing for issues such as typographical errors and phonetic similarities. Probabilistic matching technology performs statistical analysis on the data, then uses the analysis to provide a weight to the match. Leveraging the deterministic capabilities before resorting to probabilistic matching may improve data processing performance as, in many cases, the complex candidate selection and comparison logic of probabilistic matching is rendered unnecessary. Matching program 108 utilizes a deterministic algorithm prior to a probabilistic algorithm. The attributes used by the deterministic algorithm are independent of the attributes used by the probabilistic algorithm and may or may not overlap. When attempting to match a particular record, matching program 108 first looks for data records that share deterministic buckets with the record in question, and the identified data records will not be used during subsequent comparison of the probabilistic matching routine. One implementation of matching program 108 is described in further detail in FIG. 2.

Database 110 contains various types of data records that require matching and/or linking by matching program 108. An example of data records that require matching include patient records that contain attributes such as names, addresses and social security numbers. Another example of data records that require matching are inventory records that contain attributes such as part number, manufacturer and bin location. Database 110 may be part of a federated database that includes database 114 and database 116. In an exemplary embodiment, database 110 resides on server computer 106 of FIG. 1, however database 110 may reside on any computing device that can be connected to server computer 106 via network 102.

Client computing device 104 may be a desktop computer, a laptop computer, a tablet computer, a specialized computer server, a smartphone, or any programmable electronic device capable of communicating with server computer 106, database 114, and database 116 via network 102 and with various components and devices within distributed data processing environment 100. In general, client computing device 104 represents any programmable electronic device or combination of programmable electronic devices capable of executing machine-readable program instructions and communicating with other computing devices via a network, such as network 102. Client computing device 104 may be used by a data steward. A data steward is a person responsible for maintaining data records in a master data management system. This responsibility includes removing duplicates from the master data. A data steward may use client computing device 104 to interface, via network 102, with server computer 106. A data steward may also use client computing device 104 to interface with databases 110, 114 and 116. Client computing device 104 includes user interface 112.

User interface 112 provides an interface for client computing device 104 to communicate, via network 102, with matching program 108 on server computer 106. User interface 112 provides the means for a data steward to interface with matching program 108 on server computer 106. In one embodiment, user interface 112 may be a web-based user interface accessible to each respective user via network 102. In some illustrative embodiments, user interface 112 may be downloaded over network 102 from another device or data processing system, e.g. server computer 106. For example, program code stored in a computer readable storage medium in a server data processing system may be downloaded over a network, such as network 102, from server computer 106 to client computing device 104. The data processing system providing user interface 112 may be a server computer, a client computer or some other device capable of storing and transmitting program code.

Network 102 can be, for example, a local area network (LAN), a wide area network (WAN) such as the Internet, or a combination of the two, and can include wired, wireless, or fiber optic connections. In general, network 102 can be any combination of connections and protocols that will support communications between server computer 106, client computing device 104, database 114, and database 116. In the preferred embodiment, network 102 is a cloud computing network. Cloud computing is a model of service delivery for enabling convenient, on-demand network access to a shared pool of configurable computing resources, for example, database 114 and database 116, that can be rapidly provisioned and released with minimal management effort or interaction with a provider of the service. Cloud networking is used for building and managing secure private networks over the public Internet by utilizing global cloud computing infrastructure. In cloud networking, traditional network functions and services including connectivity, security, management and control, are pushed to the cloud and delivered as a service.

Database 114 and database 116 represent a federated database environment. A federated database system is a type of meta-database management system (DBMS) which transparently maps multiple autonomous database systems into a single federated database. The constituent databases are interconnected via a computer network and may be geographically decentralized. A federated database is a composite of all constituent databases in a federated database system. There is no actual data integration in the constituent disparate databases as a result of data federation. In an exemplary embodiment, the federated database that includes database 110, database 114 and database 116 is connected via network 102. Database 114 and database 116 may be located on single, or multiple server computers, or elsewhere within distributed data processing environment 100, accessible via network 102. Database 114 and database 116 contain various types of data records that require matching and/or linking by matching program 108. As described above with reference to database 110, an example of data records that require matching include patient records that contain attributes such as names, addresses and social security numbers. Another example of data records that require matching are inventory records that contain attributes such as part number, manufacturer and bin location.

Figure 2:
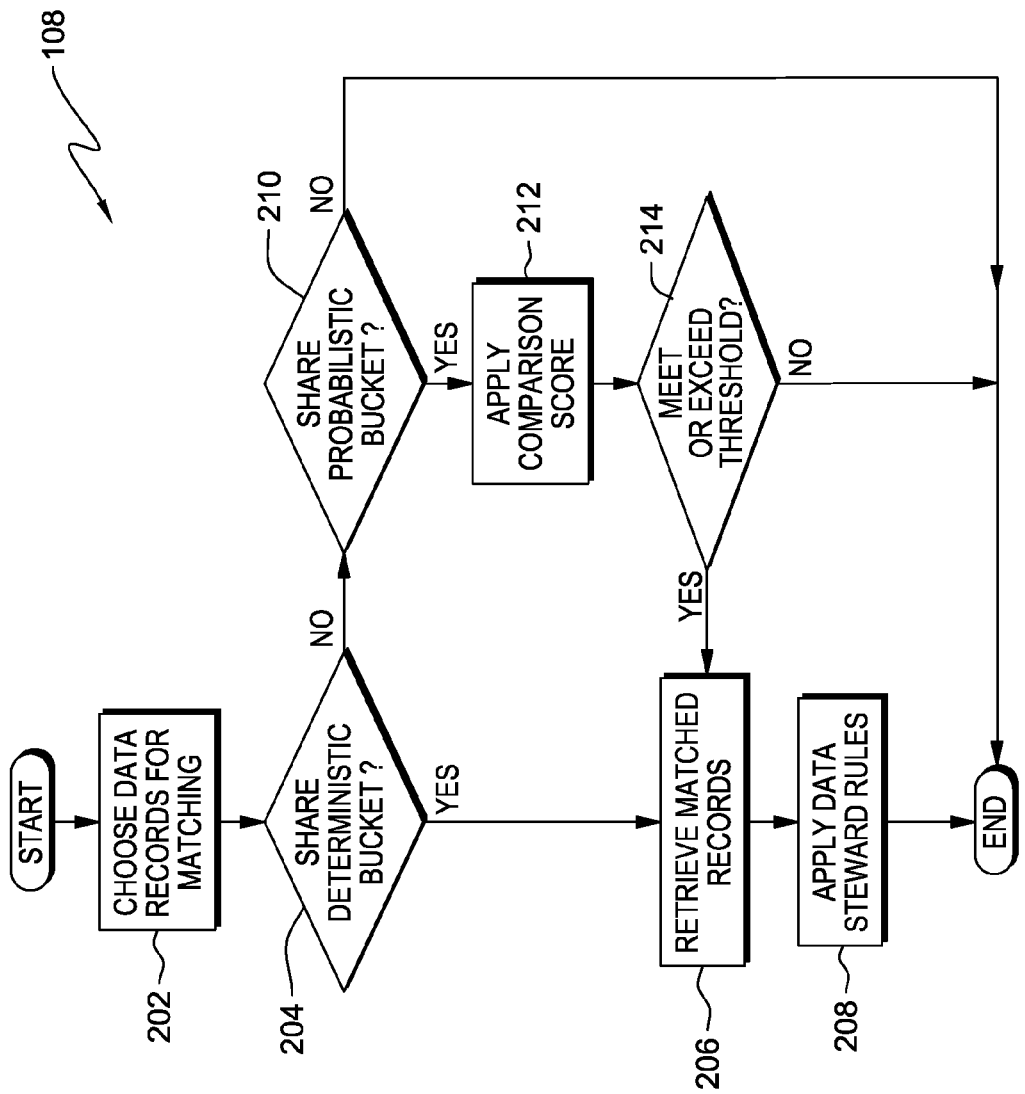
FIG. 2 is a flowchart depicting operational steps of a matching program, on a server computer within the data processing environment of FIG. 1, for combining deterministic and probabilistic matching algorithms in one matching engine, in accordance with an embodiment of the present invention.

FIG. 2 is a flowchart depicting operational steps of matching program 108 for combining a deterministic matching algorithm(s) with a probabilistic matching algorithm(s) in one matching engine, in accordance with an embodiment of the present invention.

Matching program 108 chooses data records for matching (step 202). Examples of data records include individual names, company names, addresses, tax identification numbers, and inventory part numbers. The data records may reside in database 110, database 114 and/or database 116. For example, if a company wishes to reduce duplication of direct mail marketing, the company may use matching program 108 to match household addresses in their databases to eliminate sending the same mail to multiple people at the same address.

Matching program 108 determines whether records of the data set share a deterministic bucket (decision block 204). A bucket is a data matching category. For example, a deterministic bucket may include identification information, such as social security number, full name, and date of birth. A plurality of buckets exists depending on the type of data to be matched. The deterministic algorithm allows data records that can be matched using simple rules to be identified and linked without entering the probabilistic matching logic. Matching program 108 first identifies any data records that share a deterministic bucket (yes branch, decision block 204), and those data records are automatically considered a match. For those data records where matching program 108 does not identify any shared deterministic buckets (no branch, decision block 204), matching program 108 then determines whether those data records share a probabilistic bucket (decision block 210). Buckets in the probabilistic algorithm are defined to be made up of independent attributes to maximize the probable candidate pool. Probabilistic matching takes into account a wider range of potential "identifiers", i.e. different types of data records, computing weights for each identifier based on its estimated ability to correctly identify a match or a non-match, and using these weights to calculate the probability that two given data records refer to the same entity.

If matching program 108 determines that none of the data set records share a probabilistic bucket, no matches exist and matching program 108 ends (no branch, decision block 210). If matching program 108 identifies data records that share a probabilistic bucket (yes branch, decision block 210), matching program 108 applies a comparison score to each record (step 212). In one embodiment, matching program 108 may define the comparison score, or a measure of similarity, between two data records as the "distance", or the number of deletions, insertions or substitutions required to transform one record into the other. For example, the distance between "Smith" and "Smith" is zero because no transformations are needed to match the two records. However the distance between "Smith" and "Smyth" is one because one substitution is needed to transform "Smyth" into a match with "Smith". In this example, "Smith" and "Smythe" have a distance of two. In another embodiment, the comparison score may depend on the number of matches between several data records in a bucket. For example, if the probabilistic bucket includes full name and date of birth, matching program 108 may assign a score of one if one of the two data records match, or matching program 108 may assign a score of two if both of the data records match.

Subsequent to applying a comparison score, matching program 108 determines whether the score meets or exceeds a threshold value (decision block 214). The threshold value may be predetermined by data stewards. In one embodiment, where data stewards are responsible for removing any duplicates from the master data, the data stewards for the particular application of matching program 108 determine the degree of matching required. For example, if the comparison score is defined as the number of deletions, insertions or substitutions required to transform one record into the other, the data stewards may define the threshold as a distance of zero. In that case, the data records are required to be an exact match. In another embodiment, matching program 108 may require a match between each data record in the probabilistic bucket. For example, if there are two data records in the bucket, and the threshold is defined as two, both data records in the bucket must match to be above the threshold. If the data records comparison score does not meet or exceed the required matching threshold value (no branch, decision block 214), the data records are not considered a match, and matching program 108 ends.

If the data records share a deterministic bucket (yes branch, decision block 204) or if the data records that share a probabilistic bucket meet or exceed the matching threshold value (yes branch, decision block 214), matching program 108 retrieves the matched data records (step 206). The matched data records are retrieved from at least one of the databases in the federated database environment, for example, database 110, database 114 and/or database 116.

In the preferred embodiment, matching program 108 is customized for the particular user application requiring matching. Customization includes defining matching rules as required by the data stewards. Subsequent to retrieving the matched data records, matching program 108 applies the rules defined by the data stewards (step 208). For any data set matching application, the data stewards of that application define the rules that determine the final match outcome. For example, if the comparison score threshold does not require an exact match, the data stewards may define additional matching rules not specified in either the deterministic or probabilistic buckets to produce a final match. If, for example, matching program 108 retrieves the full names "Steven Smith" and "Stephen Smith" as matched data records, the data stewards may have set a rule that full names match only if the social security numbers associated with the full names also match.

Figure 3:
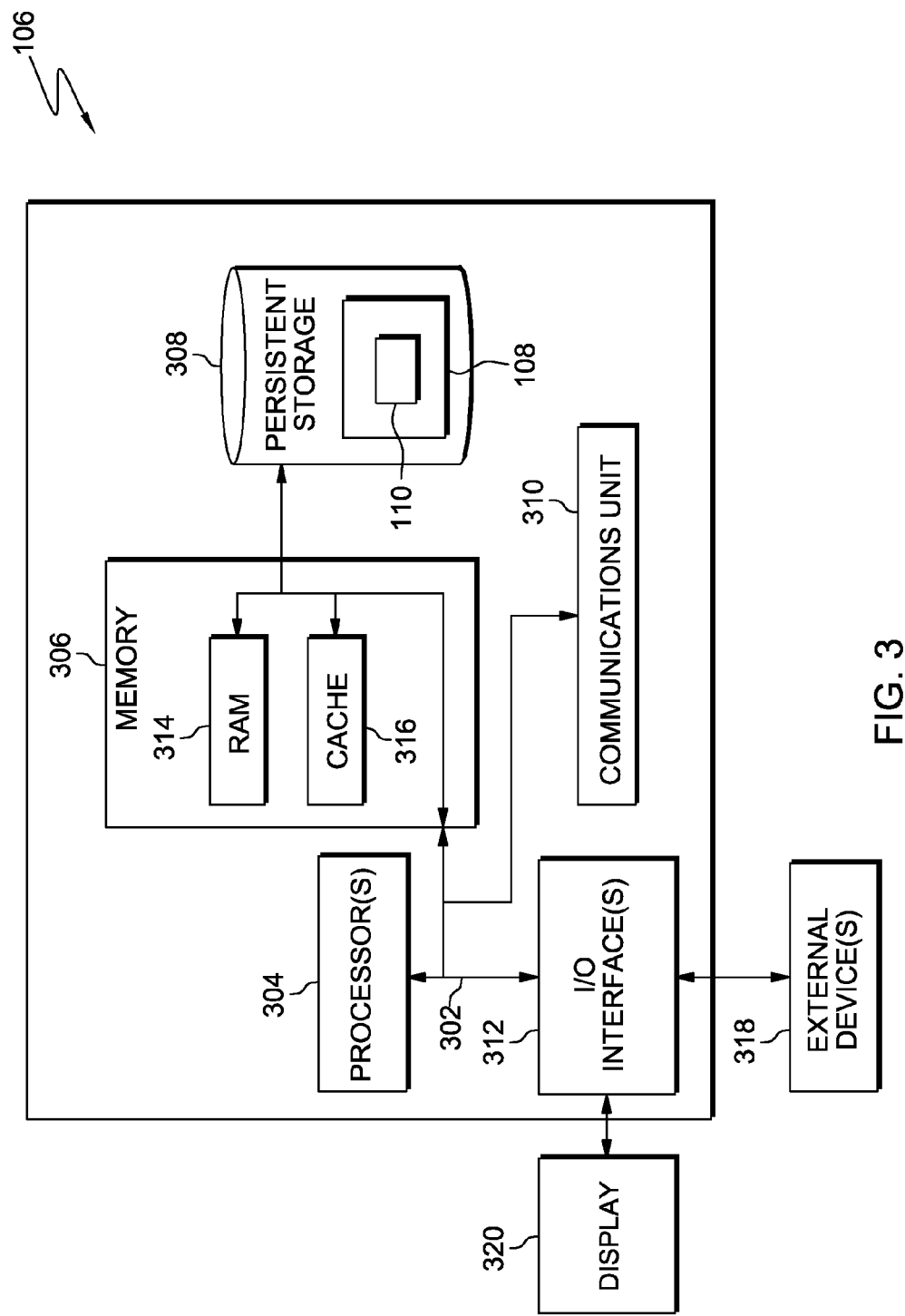
FIG. 3 depicts a block diagram of components of the server computer executing the matching program, in accordance with an embodiment of the present invention.

FIG. 3 depicts a block diagram of components of server computer 106 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 106 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Matching program 108 and database 110 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including client computing device 104, database 114, and database 116. In these examples, communications unit 310 includes one or more network interface cards. Communications unit 310 may provide communications through the use of either or both physical and wireless communications links. Matching program 108 and database 110 may be downloaded to persistent storage 308 through communications unit 310.

I/O interface(s) 312 allows for input and output of data with other devices that may be connected to server computer 106. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., matching program 108 and database 110, can be stored on such portable computer-readable storage media and can be loaded onto persistent storage 308 via I/O interface(s) 312. I/O interface(s) 312 also connects to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for data management, the computer program product comprising:
one or more computer-readable storage media and program instructions stored on the one or more computer-readable storage media, the program instructions comprising:
program instructions to select a first data record and a second data record, wherein one or more attributes of the data records used by a deterministic algorithm are independent of one or more attributes of the data records used by a probabilistic algorithm, and wherein the one or more attributes of the data records used by the deterministic algorithm overlap the one or more attributes of the data records used by the probabilistic algorithm;
program instructions to determine whether the first data record and the second data record share a deterministic matching category, wherein a matching category includes one or more data record types;
program instructions to, responsive to determining the first data record does not share a deterministic matching category with the second data record, determine whether the first data record and the second data record share a probabilistic matching category;
responsive to determining that the first data record and the second data record share a probabilistic matching category, program instructions to whether one or more additional records in the probabilistic matching category match;
program instructions to set a comparison score as a number of matching records in the probabilistic matching category;
program instructions to determine whether the comparison score meets or exceeds a predetermined threshold value;
program instructions to, responsive to determining that the comparison score meets or exceeds the predetermined threshold value, retrieve matched data records; and
program instructions to, subsequent to retrieving matched data records, apply data steward rules to the matched data records, wherein the data steward rules define additional requirements to determine a final match outcome.

2. The computer program product of claim 1, wherein the program instructions to determine a comparison score for the first data record and the second data record further comprise:
program instructions to determine at least one of an attribute of the first data record matches at least one of an attribute of the second data record; and
program instructions to set the comparison score as a number of matching attributes between the first data record and the second data record.

3. The computer program product of claim 1, further comprising:
program instructions to, responsive to determining that the first data record and the second data record share a deterministic matching category, retrieve matched data records.

4. The computer program product of claim 1, further comprising:
program instructions wherein the first data record and the second data record are stored in one or more databases within a clouded federated database system.

5. A computer system for data management, the computer system comprising:
one or more computer processors;
one or more computer-readable storage media;
program instructions stored on the computer-readable storage media for execution by at least one of the one or more processors, the program instructions comprising:
program instructions to select a first data record and a second data record, wherein one or more attributes of the data records used by a deterministic algorithm are independent of one or more attributes of the data records used by a probabilistic algorithm, and wherein the one or more attributes of the data records used by the deterministic algorithm may overlap the one or more attributes of the data records used by the probabilistic algorithm;
program instructions to determine whether the first data record and the second data record share a deterministic matching category, wherein a matching category includes one or more data record types;
program instructions to, responsive to determining the first data record does not share a deterministic matching category with the second data record, determine whether the first data record and the second data record share a probabilistic matching category;
responsive to determining that the first data record and the second data record share a probabilistic matching category, program instructions to determine whether one or more additional records in the probabilistic matching category match;
program instructions to set a comparison score as a number of matching records in the probabilistic matching category;
program instructions to determine whether the comparison score meets or exceeds a predetermined threshold value;
program instructions to, responsive to determining that the comparison score meets or exceeds the predetermined threshold value, retrieve matched data records; and
program instructions to, subsequent to retrieving matched data records, apply data steward rules to the matched data records, wherein the data steward rules define additional requirements to determine a final match outcome.

6. The computer system of claim 5, wherein the program instructions to determine a comparison score for the first data record and the second data record further comprise:
- program instructions to determine at least one of an attribute of the first data record matches at least one of an attribute of the second data record; and
- program instructions to set the comparison score as a number of matching attributes between the first data record and the second data record.

7. The computer system of claim 5, further comprising: program instructions to, responsive to determining that the first data record and the second data record share a deterministic matching category, retrieve matched data records.

* * * * *